United States Patent
Sasaki (10) Patent No.: US 9,227,510 B2
(45) Date of Patent: Jan. 5, 2016

(54) FUEL TANK AFFIXING STRUCTURE FOR CONSTRUCTION MACHINE

(75) Inventor: Katsuhiro Sasaki, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 190 days.

(21) Appl. No.: 14/002,006

(22) PCT Filed: Mar. 15, 2012

(86) PCT No.: PCT/JP2012/056722
§ 371 (c)(1),
(2), (4) Date: Aug. 28, 2013

(87) PCT Pub. No.: WO2012/124769
PCT Pub. Date: Sep. 20, 2012

(65) Prior Publication Data
US 2013/0341481 A1    Dec. 26, 2013

(30) Foreign Application Priority Data
Mar. 17, 2011    (JP) .................................. 2011-059496

(51) Int. Cl.
*B60K 15/067*    (2006.01)
*E02F 9/08*    (2006.01)

(52) U.S. Cl.
CPC ............. *B60K 15/067* (2013.01); *E02F 9/0883* (2013.01); *B60Y 2200/412* (2013.01)

(58) Field of Classification Search
CPC ................ B60K 2015/0474; B60K 2015/0458
See application file for complete search history.

(56) References Cited

U.S. PATENT DOCUMENTS

| 3,915,491 | A |   | 10/1975 | Montgomery |
| 4,540,191 | A | * | 9/1985 | Hoch ............................ 280/834 |
| 4,573,694 | A | * | 3/1986 | Goto et al. ..................... 280/834 |

(Continued)

FOREIGN PATENT DOCUMENTS

| DE | 10 99 874 B | 2/1961 |
| EP | 1 489 234 A1 | 12/2004 |

(Continued)

OTHER PUBLICATIONS

Extended European Search Report dated Jul. 8, 2014 (seven (7) pages).
Corresponding International Search Report with partial English Translation dated Jun. 19, 2012 (three (3) pages).

*Primary Examiner* — Gary Hoge
(74) *Attorney, Agent, or Firm* — Crowell & Moring LLP (57) ABSTRACT

To provide a fuel tank fixing structure for a construction machine, which does not require a belt and is capable of fixing a fuel tank on a vehicle body stably.
The present invention provides a fuel tank fixing structure, for example when fixing a fuel tank 11 made of synthetic resin on a revolving frame 2a of a revolving superstructure 2 of a compact excavator, that includes a standing member having a supporting member 11 to be fixed on the revolving frame 2a in a standing state, a hydraulic oil tank 10 made of iron, and a fixing bracket 14 made of iron, and a holding assembly for holding a fuel feed opening 11a provided on the fuel tank 11, such as a holding bracket 13 made of iron. A bushing 15 is engaged with a hole 13a1 formed in a plate part 13a of the holding bracket 13. The feed opening 11a of the fuel tank 11 is inserted into a hole 15a of the bushing 15 so that the feed opening 11a of the fuel tank 11 is held by the holding bracket 13 via the bushing 15.

2 Claims, 8 Drawing Sheets

(56) References Cited

U.S. PATENT DOCUMENTS

| | | | |
|---|---|---|---|
| 4,952,347 A | 8/1990 | Kasugai | |
| 7,069,736 B2* | 7/2006 | Kamimae et al. | 62/244 |
| 2007/0000574 A1* | 1/2007 | DeCapua et al. | 141/350 |
| 2007/0210607 A1* | 9/2007 | Murabayashi et al. | 296/97.22 |
| 2008/0314854 A1* | 12/2008 | Kamiya et al. | 212/289 |
| 2010/0071986 A1* | 3/2010 | Miyachi | 180/326 |
| 2010/0095925 A1 | 4/2010 | Sotiriades | |
| 2011/0017537 A1* | 1/2011 | Andou et al. | 180/89.16 |
| 2014/0291047 A1* | 10/2014 | Matsumoto et al. | 180/69.4 |

FOREIGN PATENT DOCUMENTS

| | | |
|---|---|---|
| EP | 2 168 805 A2 | 3/2010 |
| GB | 709895 A | 6/1954 |
| JP | 9-272347 A | 10/1997 |
| JP | 3650884 B2 | 5/2005 |
| JP | 2009-179960 A | 8/2009 |

* cited by examiner

FUEL TANK AFFIXING STRUCTURE FOR CONSTRUCTION MACHINE

TECHNICAL FIELD

The present invention relates to a fuel tank fixing structure that is arranged in a construction machine such as a compact excavator and is used for fixing a fuel tank that stores therein fuel for an engine on a vehicle body.

BACKGROUND ART

Figure 8:
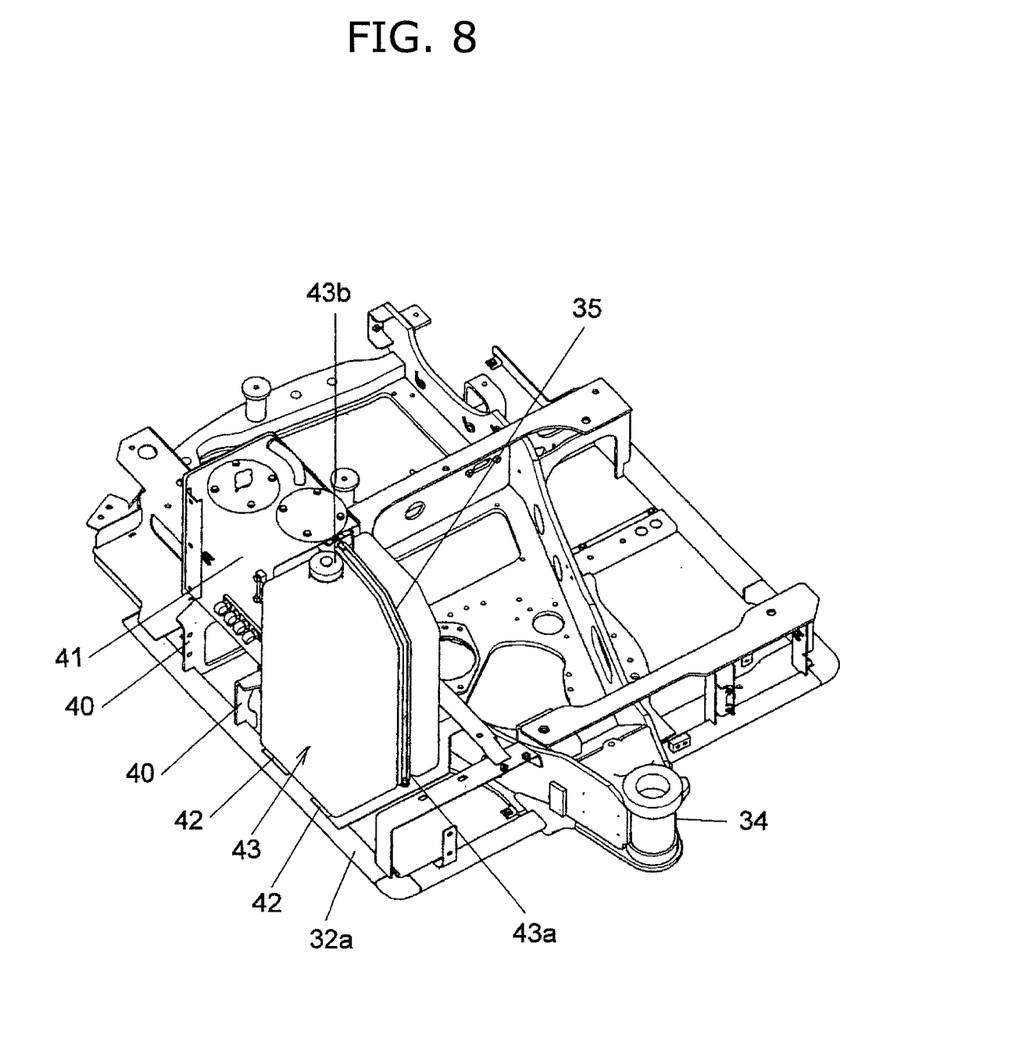
FIG. 8 is a perspective view of a conventional fuel tank fixing structure.
Figure 9:
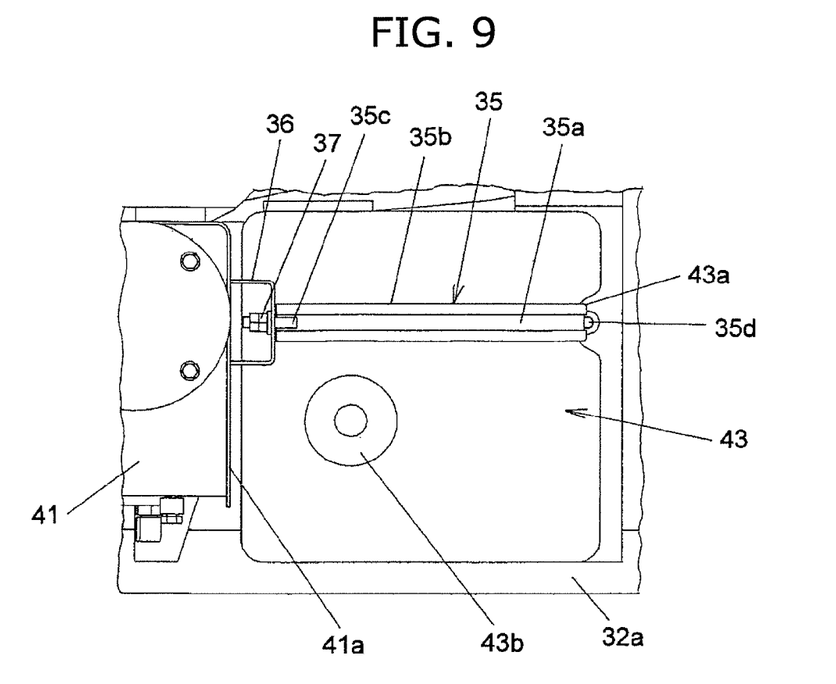
FIG. 9 is an enlarged top view of a main part of the conventional fuel tank fixing structure illustrated in FIG. 8.
Figure 10:
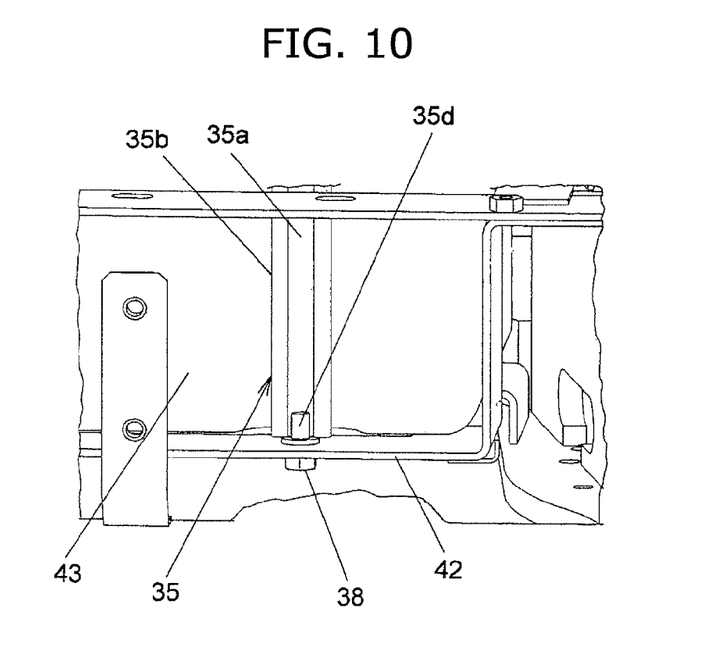
FIG. 10 is an enlarged front view of a main part of the conventional fuel tank fixing structure illustrated in FIG. 8.

FIG. 8 is a perspective view of a conventional fuel tank fixing structure, FIG. 9 is an enlarged top view of a main part of the conventional fuel tank fixing structure of FIG. 8, and FIG. 10 is an enlarged front view of a main part of the conventional fuel tank fixing structure of FIG. 8.

A fuel tank fixing structure illustrated in FIGS. 8 to 10 is arranged in a conventional compact excavator. As illustrated in FIG. 8, this conventional technique is configured such that a hydraulic oil tank 41 made of iron is fixed on a pair of supporting members 40 that are fixed on a revolving frame 32a of a revolving superstructure that constitutes a vehicle body, and a fuel tank 43 for storing therein fuel to be fed to an engine is arranged, on a position adjacent to and anterior to the hydraulic oil tank 41, i.e., arranged at a near side of a working-device attaching part 34 to which a working device (not shown) is attached. The fuel tank 43 is mounted on a pair of base members 42 that are fixed on the revolving frame 32a.

The fuel tank 43 is configured by, for example, a tank made of synthetic resin. A fuel tank made of iron has the advantages that it is possible to secure a large strength of the tank, however, the shape of the tank is fixed and tends to be restricted. On the other hand, when using the fuel tank 43 made of synthetic resin, the strength thereof is smaller than that of an iron tank, however, there is the advantage that the shape of the tank can be formed relatively flexibly, taking into account of the arrangement of peripheral devices, in the case of a compact excavator of which a space for installing devices is so small.

As illustrated in FIG. 9, the fuel tank 43 made of synthetic resin is provided with a groove 43a that is formed from a side surface to a top surface of the tank to avoid a feed opening 43b that enables fuel to be stored to be fed into an inside of the tank. A belt 35 that fastens the fuel tank 43 to fix it on the revolving frame 32a is arranged so as to be engaged with the groove 43a of the fuel tank 43.

As illustrated in FIGS. 9 and 10, the belt 35 includes a belt-shaped iron member 35a in the form of a thin plate and a rubber member 35b that is arranged between the belt-shaped member 35a and the groove 43a of the fuel tank 43. Furthermore, as illustrated in FIG. 9, the belt 35 includes a bolt 35c that is welded to the belt-shaped member 35a at the top side thereof, and as illustrated in FIG. 10, includes a bolt 35d that is welded to the belt-shaped member 35a at the bottom side thereof. As illustrated in FIG. 9, the bolt 35c on the top side of the belt 35 is inserted into a hole that is formed in a holding bracket 36 that is fixed to a side surface 41a of the hydraulic tank 41, and is tightened to be fixed to the holding bracket 36 by a nut 37 to be screwed with the bolt 35c. As illustrated in FIG. 10, the bolt 35d on the bottom side of the belt 35 is inserted into a hole that is formed in the base member 42 described above that is fixed to the revolving frame 32a, and is tightened to be fixed to the base member 42 by a nut 38 to be screwed with the bolt 35d.

As described above, in the fuel tank fixing structure according to the conventional technique illustrated in FIGS. 8 to 10, the fuel tank 43 made of synthetic resin is provided with the groove 43a formed therein, and the belt 35 to be engaged with the groove 43a includes the belt-shaped member 35a made of iron, the rubber member 35b, the bolt 35c, and the bolt 35d. Thereby, the fuel tank 43 is fixed on the revolving frame 32a of the revolving superstructure (a vehicle body). The patent document 1 discloses a fuel tank fixing structure including such a belt above.

PRIOR ART DOCUMENT

Patent Document

Patent Document 1: Japanese Patent No. 3650884

SUMMARY

Problems to be Solved by the Invention

The conventional technique described above and illustrated in FIGS. 8 to 10 uses the fuel tank 43 made of synthetic resin, and accordingly it is difficult to adjust the tension of the belt 35, that is, it is difficult to control a tightening torque of the bolts 35c, 35d. When the tightening torque is too large, deformation and damage of the fuel tank 43, or damage of a connecting portion between the bolts 35c, 35d and the belt-shaped member 35a may occur. On the other hand, when the tightening torque is too small, the belt 35 becomes loose, and accordingly the fuel tank 43 cannot be held in a stable state. Especially in the case of a compact excavator, the fuel tank 43 is subject to external forces from various directions, which are generated by traveling, revolving, and driving a working device during an operation for excavating such as the sand. If the belt 35 is loose, the fuel tank 43 may shake and slide due to the external forces, and consequently the fuel tank 43 cannot be held in a stable state. In this way, the conventional technique illustrated in FIGS. 8 to 10 is configured such that the fuel tank 43 is fixed on the revolving frame 32a by the belt 35, and accordingly there is a possibility that it is difficult to fix the fuel tank 43 stably on the revolving frame 32a, and also there is a problem that an operation for fixing the fuel tank becomes complicated because control of the tightening torque described above is required.

Furthermore, the conventional technique described above and illustrated in FIGS. 8 to 10 is configured such that the groove 43a to be engaged with the belt 35 is necessary to be arranged at the fuel tank 43 made of synthetic resin, and accordingly a convex portion that corresponds to the groove 43a is formed in the inside of the fuel tank 43. Thereby, the volume of the fuel tank 43 tends to become small. These problems also exist in the conventional technique shown in the patent document 1.

The present invention was made in view of such problems stemming from the conventional technique described above, and an object of the present invention is to provide a fuel tank fixing structure for a construction machine, which does not require a belt and is capable of fixing a fuel tank on a vehicle body stably.

Means for Solving the Problem

In order to achieve the object described above, the present invention provides a fuel tank fixing structure for a construction machine being provided with a vehicle body, a working device attached to the vehicle body, an engine mounted on the vehicle body, and a fuel tank that stores therein fuel to be fed to the engine and is fixed on the vehicle body by the fuel tank fixing structure, comprising: a standing member that is fixed on the vehicle body in a standing state; and a holding assembly that is connected to the standing member and holds a feed opening for fuel being formed on the fuel tank.

In the present invention configured as above, the feed opening located on a top portion of the fuel tank, where shakes the most when external forces generated with an operation performed by a working device are applied thereon, is held by the holding assembly, and the holding assembly is connected to the standing member to be fixed to the vehicle body. Thereby, it is possible to fix the fuel tank on the vehicle body stably without a belt, and thus it is not necessary to control a tightening torque for adjusting the tension of a belt.

Furthermore, according to the present invention, the fuel tank is configured by a tank made of synthetic resin.

In the present invention configured as above, even though the fuel tank is configured by a tank made of synthetic resin, it is possible to prevent the fuel tank from being damaged and deformed because the feed opening of which the strength is relatively large is held by the holding assembly. In addition, it is not necessary to form a groove for engaging a belt with the fuel tank on the fuel tank.

Furthermore, according to the present invention, the holding assembly is configured by a holding bracket that is made of iron and provided with a hole formed therein and includes a ring-shaped bushing to be engaged with a periphery portion of the hole of the holding bracket, and the feed opening of the fuel tank is inserted into a hole of the bushing that is attached to the periphery portion of the hole of the holding bracket so that the feed opening of the fuel tank is held by the holding bracket via the bushing.

In the present invention configured as above, the holding assembly is configured by the holding bracket made of iron, and accordingly it is possible to secure the strength of the holding assembly. In addition, the bushing can protect the feed opening of the fuel tank from damage that may be caused by the periphery portion of the hole formed in the holding bracket.

Furthermore, according to the present invention, the construction machine is a compact excavator including a revolving superstructure, the standing member includes a supporting member that is fixed on a revolving frame of the revolving superstructure, a hydraulic oil tank that is made of iron and fixed on the supporting member, and a fixing bracket that is fixed on the hydraulic oil tank, and the holding bracket and the fixing bracket are fixed with each other by a fastener.

In the present invention configured as above, the hydraulic oil tank can be utilized as a part of the members for fixing the fuel tank. In addition, when the size of the height of the supporting member is set in accordance with the size of the height of the hydraulic oil tank, the height of the fixing bracket to be fixed to the hydraulic oil tank can be adjusted to the both height of the holding bracket. When the holding bracket and the fixing bracket, of which the height is adjusted to be the same with each other, are fixed by the fastener, it is possible to fix the feed opening of the fuel tank easily and securely.

Furthermore, according to the present invention, the holding bracket includes a restricting part that faces a side surface of the fuel tank and restricts movement of the fuel tank.

In the present invention configured as above, movement of the side surface of the fuel tank can be restricted by the restricting part of the holding bracket, and accordingly it is possible to fix the fuel tank on the vehicle body more stably. Furthermore, the external forces applied on the fuel tank can be distributed to the bushing to be engaged with a hole of the holding bracket and to the restricting part, and accordingly it is possible to reduce the effect of the external forces on the bushing.

Effect of the Invention

The present invention is configured to include a standing member that is fixed on a vehicle body in a stable state and a holding assembly for holding a fuel feed opening that is provided on a fuel tank, and accordingly it is possible to fix the fuel tank on the vehicle body without a belt. Thereby, it is possible to simplify an operation for fixing the fuel tank and to increase the efficiency of the operation for the above more than before.

DESCRIPTION OF EMBODIMENTS

Hereinafter, an embodiment of a fuel tank fixing structure for a construction machine according to the present invention will be described with reference to the drawings.

Figure 1:
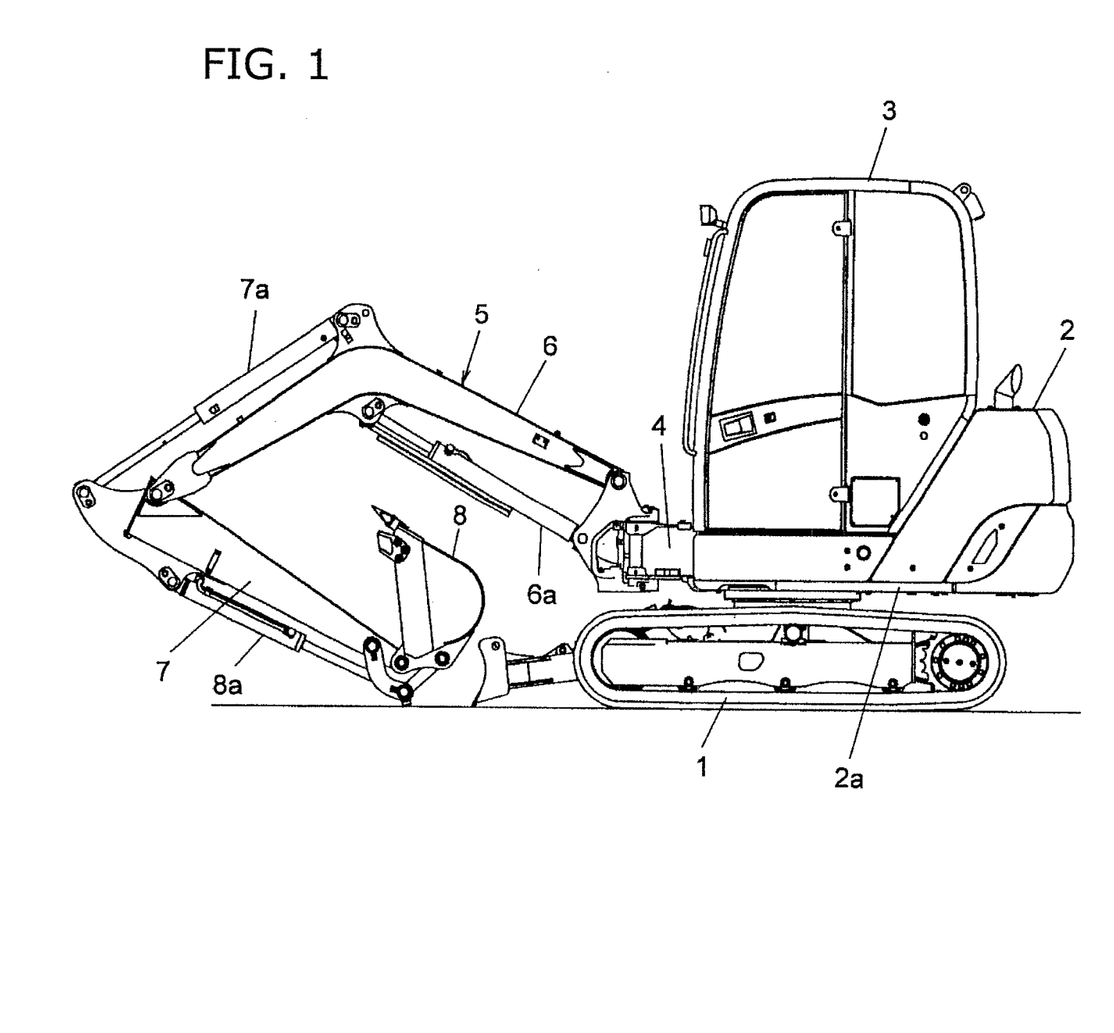
FIG. 1 is a side view of a compact excavator illustrated as an example of a construction machine including an embodiment of a fuel tank fixing structure according to the present invention.
Figure 2:
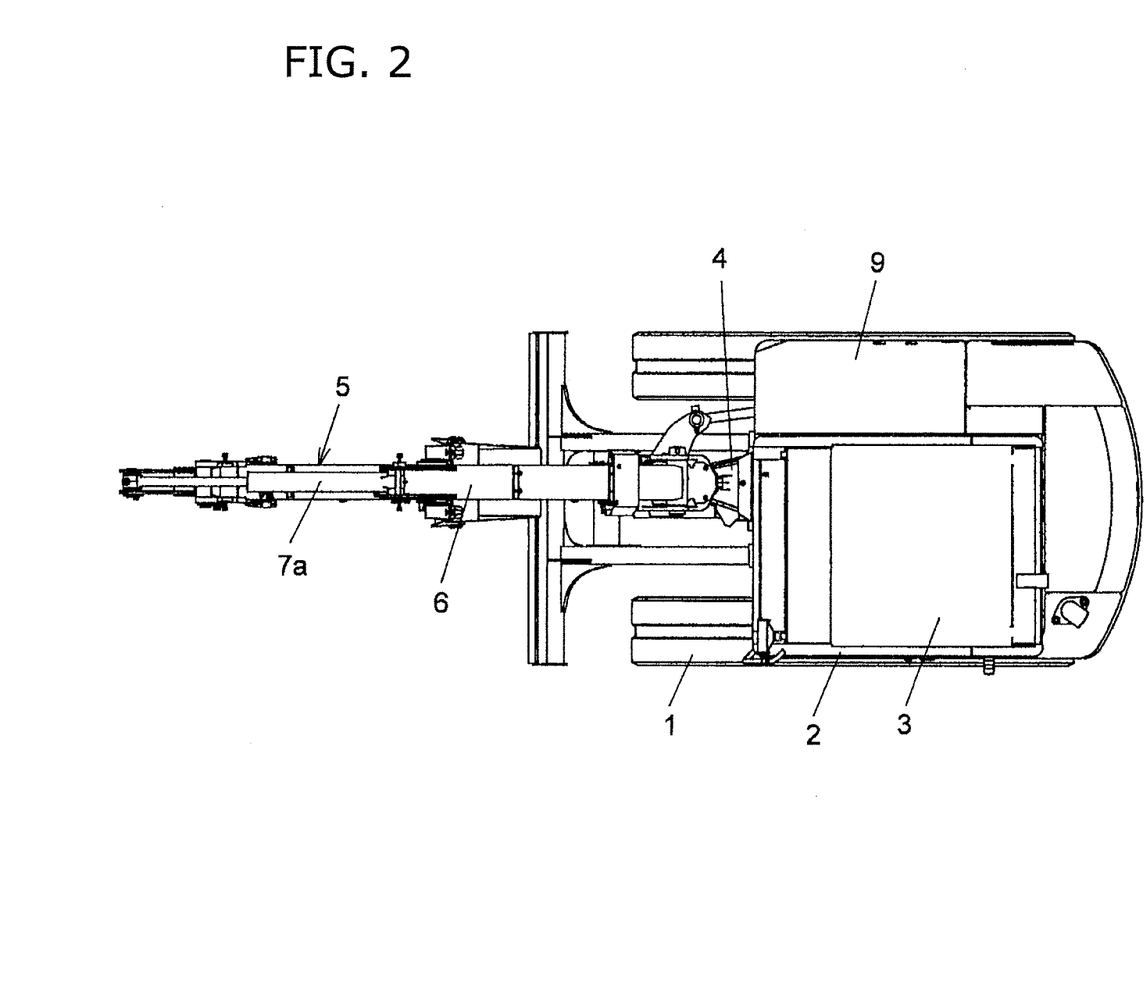
FIG. 2 is a top view of the compact excavator of FIG. 1.

A construction machine that includes a fuel tank fixing structure according to an embodiment of the present invention is, for example, a compact excavator of which an area for installing devices is small and restricted. As illustrated in FIG. 2, the compact excavator includes an undercarriage 1 and a revolving superstructure 2 that is arranged on the undercarriage 1. The undercarriage 1 and the revolving superstructure 2 constitute a vehicle body. An operator's cab 3 is arranged on a revolving frame 2a of the revolving superstructure 2. A working device 5 including, for example, a boom 6, an arm 7, a bucket 8, a boom cylinder 6a for driving the boom 6, an arm cylinder 7a for driving the arm 7, and a bucket cylinder 8a for driving the bucket 8 is attached to a working-device attachment part 4 that is provided on a position at the front side of the revolving superstructure 2. A fuel tank 11 to be fixed by the present embodiment, which will be described below, is located in the inside of an exterior cover 9 that is provided at the revolving superstructure 2 illustrated in FIG. 2.

Figure 3:
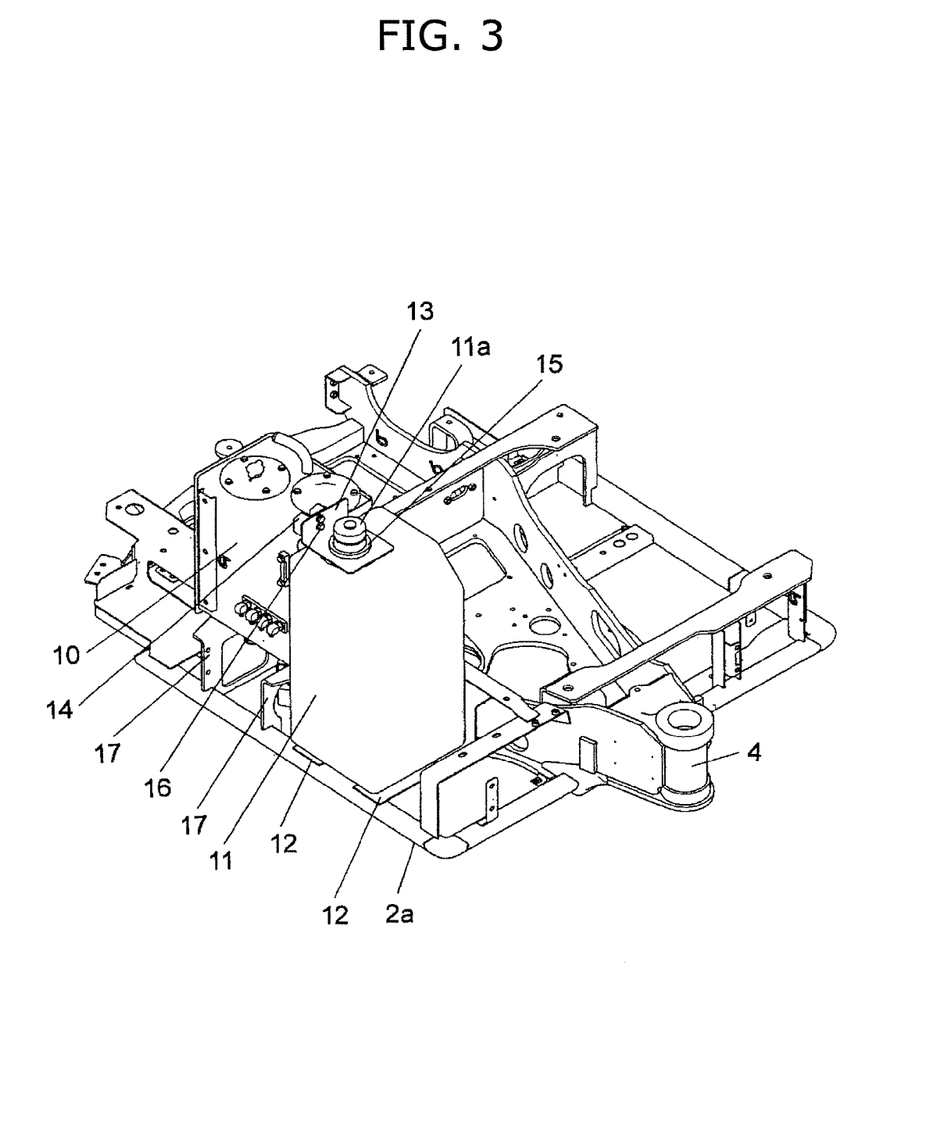
FIG. 3 is a perspective view of an embodiment of a fuel tank fixing structure according to the present invention, which is included in the compact excavator of FIG. 1.

As illustrated in FIG. 3, for example, a hydraulic oil tank 10 made of iron is fixed on a pair of supporting members 17 that are made of steel and fixed on the revolving frame 2a of the revolving superstructure 2. The fuel tank 11 for storing therein fuel to be fed to an engine (not shown) is located on a position adjacent to and anterior to the hydraulic oil tank 10, i.e., located at a near side of the working-device attaching part 4 to which the working device 5 is attached. The fuel tank 11 is mounted on a pair of base members 12 that are made of steel and fixed on the revolving frame 2a. The fuel tank 11 is, for example, configured by a tank made of synthetic resin.

The fuel tank fixing structure according to the present embodiment includes a standing member to be fixed in a standing state on the revolving frame 2a of the revolving superstructure 2 that constitutes a vehicle body, and a holding assembly for holding a feed opening 11a provided on the fuel tank 11 as illustrated in FIG. 3.

Figure 4:
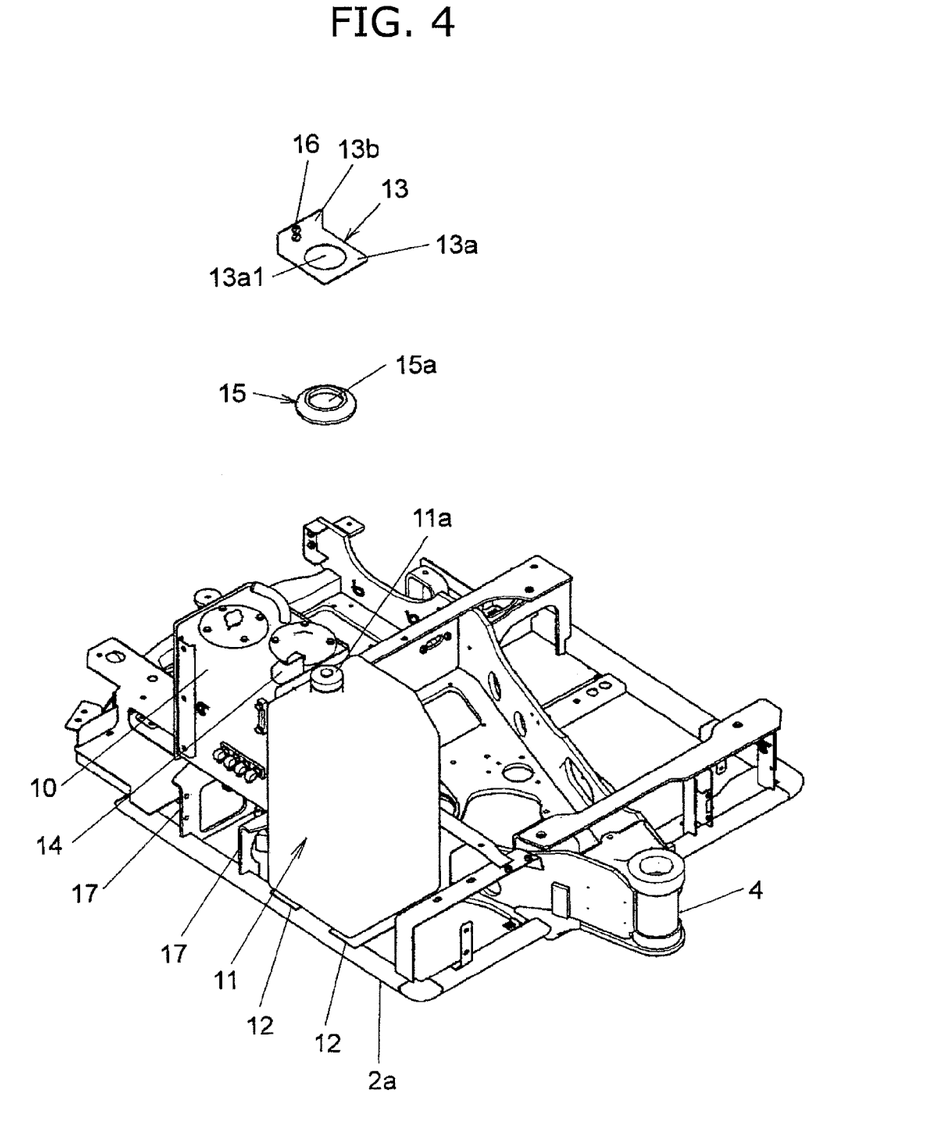
FIG. 4 is an exploded perspective view of a main part illustrated in FIG. 3.

As illustrated in FIG. 4, the holding assembly is configured by a holding bracket 13 made of iron, which includes a plate part 13a in which a hole 13a1 is formed and a standing part 13b that is bended upwardly from the plate part 13a. Furthermore, the fuel tank fixing structure according to the present embodiment includes a ring-shaped bushing 15 made of a rubber member that is an elastic member, which is attached to a periphery portion of the holding bracket 13. As illustrated in FIG. 3, the feed opening 11a of the fuel tank 11 is inserted into a hole 15a provided in the bushing 15, which is engaged with the periphery portion of the hole 13a1 formed in the plate part 13a of the holding bracket 13 so that the feed opening 11a of the fuel tank 11 is held by the holding bracket 13 via the bushing 15.

The standing member described above includes the above-mentioned supporting members 17 to be fixed on the revolving frame 2a of the revolving superstructure 2, the hydraulic oil tank 10 to be fixed on the supporting members 17, and a fixing bracket 14 made of iron, which is fixed on the hydraulic oil tank 10 as illustrated in FIGS. 3 and 4.

Figure 5:
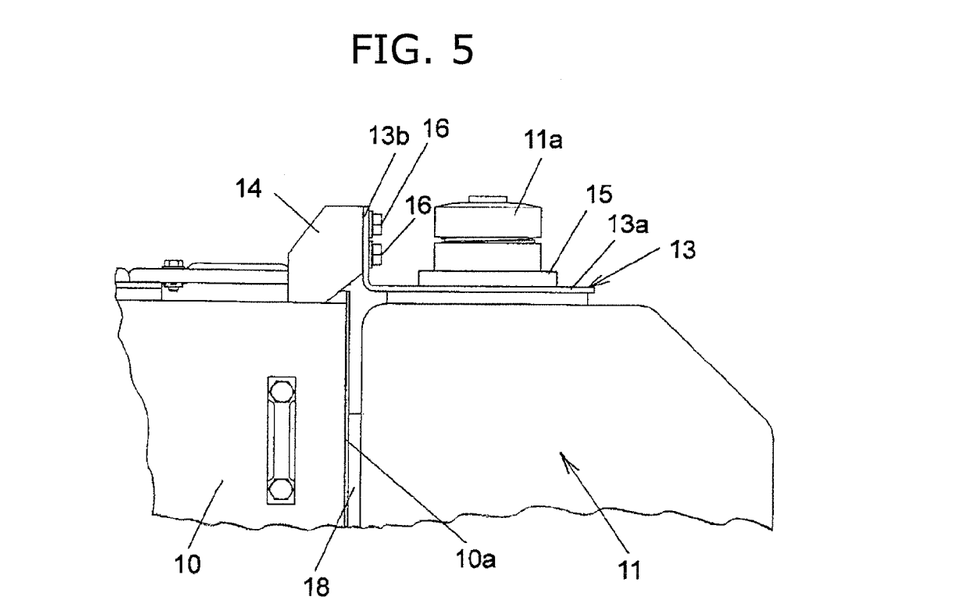
FIG. 5 is an enlarged side view of a main part of an embodiment of the fuel tank fixing structure of FIG. 3.

As illustrated in FIG. 5, a standing part 13b of the holding bracket 13 for holding the feed opening 11a of the fuel tank 11 and the fixing bracket 14 provided on the hydraulic oil tank 10 are fixed with each other by a fastener, for example, by a bolt 16 to be inserted into a hole formed in the standing part 13b of the holding bracket 13 and a nut (not shown) to be screwed with the bolt 16.

Figure 6:
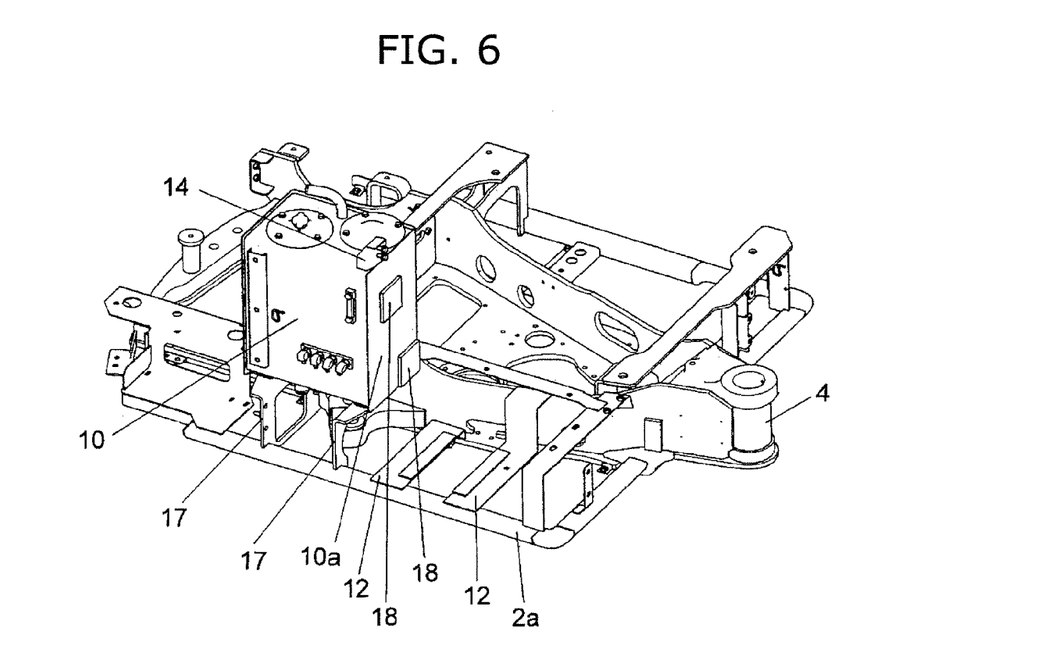
FIG. 6 is a perspective view of a state illustrated in FIG. 3, of which a fuel tank and a holding bracket are removed.

As illustrated in FIGS. 5 and 6, in the present embodiment, a protective rubber 18 for protecting the fuel tank 11 from damage that may be caused by contact between the hydraulic oil tank 10 and the fuel tank 11 is placed between a side surface 10a of the hydraulic oil tank 10 made of iron and a side surface, which faces the side surface 10a, of the fuel tank 11 made of synthetic resin. The protective rubber 18 is attached, for example, to the side surface 10a of the hydraulic oil tank 10.

As described above, the present embodiment is configured such that the feed opening 11a that is located at a top portion of the fuel tank 11, where shakes the most when the external forces generated with an operation performed by the working device 5 are applied thereon, is held by the holding bracket 13, and the holding bracket 13 is connected to the standing member that includes the supporting members 17 that are fixed on the revolving frame 2a, the hydraulic oil tank 10 that is mounted on the supporting members 17, and the fixing bracket 14 to be fixed to the hydraulic oil tank 10. Thereby, it is possible to fix the fuel tank 11 on the revolving frame 2a stably without a belt, and thus it is not necessary to control a tightening torque for adjusting the tension of a belt. In this way, it is possible to simplify an operation for fixing the hydraulic oil tank 11 and to increase the efficiency of the operation for the above.

Furthermore, according to the present embodiment, even though the fuel tank 11 is configured by a tank made of synthetic resin, damage and deformation of the fuel tank 11 can be prevented because the feed opening 11a of which the strength is relatively large is held by the holding bracket 13. Consequently, it is possible to increase the durability of the fuel tank 11. In addition, a groove for engaging a belt with the fuel tank 11 is not formed in the fuel tank 11, and accordingly the large volume of the fuel tank 11 can be secured. In this way, it is possible to improve the efficiency of an operation performed by the working device 5, etc. and the traveling performance of the undercarriage 1. Moreover, when the volume of the fuel tank 11 is set to be equal to that of the conventional fuel tank, it is possible to reduce the size of the fuel tank 11, which makes it possible to improve the flexibility of arrangement of devices to be located around the fuel tank 11.

Furthermore, according to the present embodiment, the holding assembly for holding the feed opening 11a of the fuel tank 11 is configured by the holding bracket 13 made of iron, and accordingly the strength of the holding assembly can be secured. In addition, the bushing 15 made of a rubber member can protect the feed opening 11a of the fuel tank 11 from damage that may be caused by the periphery portion of the hole 13a1 formed in the plate part 13a of the holding bracket 13. In this way, it is possible to realize a more reliable fuel tank fixing structure.

Furthermore, in the present embodiment, the hydraulic oil tank 10 can be utilized as a part of the members for fixing the fuel tank 11. In addition, when the size of the height of the supporting member 17 is set in accordance with the size of the height of the hydraulic oil tank 10, the height of the fixing bracket 11 to be fixed to the hydraulic oil tank 10 can be adjusted to the height of the standing part 13b of the holding bracket 13. When the standing part 13b of the holding bracket 13 and the fixing bracket 14, of which the both height is adjusted to be the same with each other, are fixed by the bolt 16 and a nut (not shown) to be screwed with the bolt 16, it is possible to fix the feed opening 11a of the fuel tank 11 easily and securely. The configurations above contribute to realize a more reliable fuel tank fixing structure.

Figure 7:
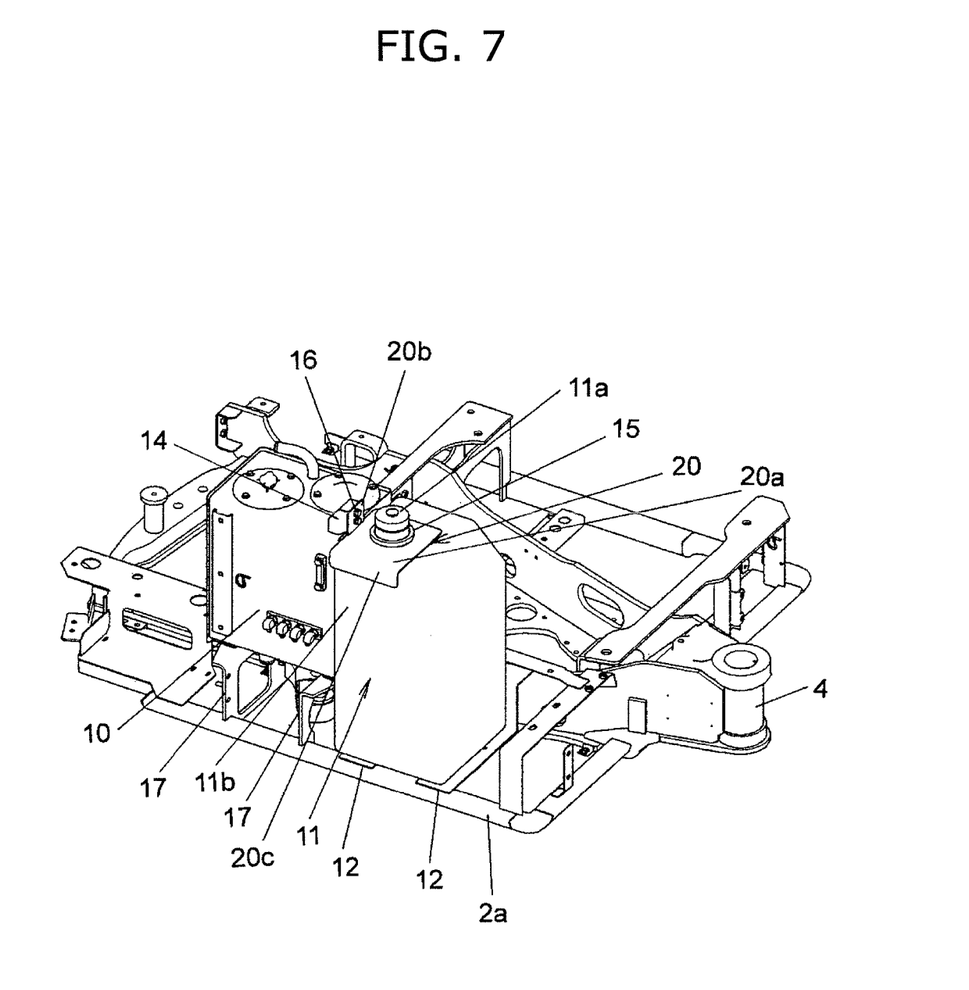
FIG. 7 is a perspective view of a second embodiment according to the present invention.

FIG. 7 is a perspective view of a second embodiment according to the present invention. As illustrated in the second embodiment of FIG. 7, a holding bracket 20 that is a holding assembly for holding the feed opening 11a of the fuel tank 11 can be provided. The holding bracket 20 is configured to include a plate part 20a having a feed opening 11a therein and a standing part 20b that is bended upwardly from the plate part 20a and fixed on the fixing bracket 10. In addition to the above, the holding bracket 20 includes a restricting part 20c for restricting movement of the fuel tank 11, which is bended downwardly from the plate part 20a so as to face a side surface 11b of the fuel tank 11. It is noted that the other configurations of the second embodiment is the same as those of the first embodiment.

In the second embodiment configured as above, movement of the side surface 11b of the fuel tank 11 can be restricted by the restricting part 20c, and accordingly the fuel tank 11 can be fixed on the revolving frame 2a more stably. Furthermore, the external forces to be applied on the fuel tank 11 can be distributed to the bushing 15 to be engaged with a hole of the plate part 20a of the holding bracket 20 and to the restricting part 20c, and accordingly it is possible to reduce the influence of the external forces on the bushing 15. In this way, it is possible to secure the durability and the stability more.

In the respective embodiments above, the fuel tank 11 is configured by a tank made of synthetic resin, however, the present invention is not limited to the case where the tank is made of synthetic resin. In the present invention, when a large area for installing a fuel tank and the high flexibility of arranging the tank can be secured, the fuel tank can be configured by an iron tank. In this case, a feed opening of the iron tank is held by the holding assembly, and the holding assembly is connected, for example, to the standing member fixed on the revolving frame 2a.

Furthermore, in the respective embodiments above, the standing member to be connected to the holding bracket 13 or 20 includes the supporting members 17 fixed on the revolving frame 2a, the hydraulic oil tank 10 made of iron, and the fixing bracket 14, however, the present invention is not limited to the case in which the standing member is configured as above. In the present invention, for example, the standing member can be configured to be fixed on the revolving frame 2a, extended vertically, and provided with a supporting pole member made of iron and having the adequate strength so that the holding bracket 13 or 20 for holding the feed opening 11a of the fuel tank 11 is connected to the supporting pole member. In this case, the hydraulic oil tank 10 is not directly involved with an operation for fixing the fuel tank 11, and accordingly the hydraulic oil tank 10 can be made of synthetic resin.

Furthermore, for example, when the standing member is configured by the supporting pole member as described above, a top end portion of the supporting pole member can be bended so as to serve as a holding bracket. That is, the standing member and the holding assembly can be configured integrally.

EXPLANATION OF REFERENCES

2 revolving superstructure (vehicle body)
2a revolving frame
4 working-device attachment part
5 working device
10 hydraulic oil tank (standing member)
10a side surface
11 fuel tank
11a feed opening
11b side surface
12 base member
13 holding bracket (holding assembly)
13a plate part
13a1 hole
13b standing part
14 fixing bracket (standing member)
15 bushing
15a hole
16 bolt (fastener)
17 supporting member (standing member)
18 protective rubber
20 holding bracket
20a plate part
20b standing part
20c restricting part

The invention claimed is:

1. A fuel tank fixing structure for a compact excavator being provided with a vehicle body including a revolving superstructure, a working device attached to the vehicle body, an engine mounted on the vehicle body, and a fuel tank that stores therein fuel to be fed to the engine and is fixed on the vehicle body by the fuel tank fixing structure, comprising:
   a standing member that is fixed on the vehicle body in a standing state and includes a supporting member that is fixed on a revolving frame of the revolving superstructure, a hydraulic oil tank that is made of iron and fixed on the supporting member, and a fixing bracket that is fixed on the hydraulic oil tank;
   a holding bracket made of iron and provided with a hole formed therein, which is connected to the standing member and holds a feed opening for fuel formed on the fuel tank;
   a restricting part that is formed integrally with the holding bracket and restricts movement of the fuel tank such that the holding bracket is bended downwardly so as to face a side surface of the fuel tank; and
   a ring-shaped bushing to be engaged with a periphery portion of the hole of the holding bracket, wherein
   the feed opening of the fuel tank is inserted into a hole of the bushing that is attached to the periphery portion of the hole of the holding bracket so that the feed opening of the fuel tank is held by the holding bracket via the bushing, and
   the holding bracket and the fixing bracket are fixed with each other by a fastener.

2. The fuel tank fixing structure for a compact excavator according to claim 1, wherein the fuel tank is configured by a tank made of synthetic resin.

* * * * *